Patented Jan. 15, 1929.

1,699,479

UNITED STATES PATENT OFFICE.

JASPER P. SCOTT, OF INDIANAPOLIS, INDIANA, ASSIGNOR TO ELI LILLY AND COMPANY, OF INDIANAPOLIS, INDIANA, A CORPORATION OF INDIANA.

AMNIOTIC FLUID AND PROCESS OF PREPARING IT.

No Drawing.  Application filed April 27, 1928.  Serial No. 273,427.

This present invention relates to a purified and concentrated amniotic fluid, and the process of purifying and concentrating it. This amniotic fluid is adapted for use in the prevention, in the living body, of adhesions between tissues which are normally free from attachment to one another but which may develop a tendency to adhere, and may actually adhere, to one another as the result of any of several causes among which may be mentioned surgical operations in the various centers and cavities of the body where there are closely adjacent tissues which should not adhere. Such centers and cavities are, for instance, the abdominal cavity, the pleural cavity, and the cerebral cavity, as well as the various joints in the body; in all of which there normally are tissues that should be free from attachment to each other although they lie close together.

In addition to being used to prevent the original formation of adhesions, the amniotic fluid may also be used to prevent the re-forming of any adhesions which may have occurred and which have been surgically reduced.

This present invention is a development of the invention of Dr. Herbert L. Johnson, of Boston, Massachusetts, who discovered the beneficial effects of using amniotic fluid in and after operations in the body centers and cavities such as those above referred to, and especially in the abdomen, to prevent adhesions; as set forth in his co-pending application Serial No. 172,209, filed March 2, 1927, which application I acknowledge as prior art.

Dr. Johnson in his work used amniotic fluid substantially as obtained from abattoirs, being careful of course to avoid contamination, but with no concentration at all and with only such purification as could be obtained by filtration through filter paper and then through a Berkefeld filter to remove the blood cells and micro-organisms and other suspended foreign matters which are usually present. In some cases, Dr. Johnson obtained his sterilization by heat, or added suitable sterilizing agents, instead of and in addition to the Berkefeld filtration. He did not attempt further to purify or concentrate the fluid, other than as noted above, or to remove any fraction of the amniotic fluid proper that was not directly involved in producing the desired effect in preventing adhesions.

By my present invention, I am able to retain substantially all the potency of the original amniotic fluid, but to reduce it very greatly in volume, and to remove from it certain fractions which are present in the original amniotic fluid and which not only seem to have no beneficial effects in the prevention of adhesions but in all probability exert a harmful or shock effect, or at least have the possibility of doing so.

In carrying out my invention, I remove certain fractions of the amniotic fluid which are insoluble in certain lower alcohol concentrations, say up to the neighborhood of 70% or 80% alcohol concentration; and desirably also remove other fractions which are soluble in certain higher alcohol concentrations, say in the neighborhood of 90% or 95% alcohol concentrations. I have found that the remainder, which is an intermediate fraction and is what is soluble at the lower alcohol concentrations and insoluble at the higher, contains nearly all of the potent material for preventing adhesions.

I may use amniotic fluid which has already been filtered as contemplated by Dr. Johnson, but I prefer to start with fresh amniotic fluid obtained from suitable pregnant mammals, most conveniently cows, as soon after slaughter as possible. I do this, as Dr. Johnson did, with as much care as possible to prevent contamination from outside; draining the amniotic fluid directly from the sacs containing it into sterile containers. In obtaining the amniotic fluid, I preferably drain the entire fluid contents of the uterine sac into the sterile container.

The fluid thus obtained is desirably subjected at once to my purification process. This is in order to avoid any action of enzymes which may be present. A suitable preservative is desirably added, to reduce the chance of decomposition, especially if it is necessary to delay the treatment of the amniotic fluid; and in case there is such delay, the fluid is desirably maintained at a low temperature, as close to 0° C. as convenient. One such suitable preservative is chloroform; and desirably a small quantity of chloroform is put into each of the containers into which the amniotic fluid is drained from the uterine sac, before such draining is done.

In purifying the amniotic fluid, it is desirably first centrifuged, and separated from any foreign matter, such as fœtal hairs, blood cells, strips of connective tissue, etc., which are usually found in it, even if there is no contamination from the outside in withdrawing it from its sac. There may or may not be contamination produced upon withdrawing the fluid from the sac originally containing it, but there is always danger of such contamination, especially under slaughterhouse conditions. The possibility of contamination upon withdrawing the fluid from its sac, as well as the possibility of contamination during the later steps in purifying the fluid, may be prevented or greatly reduced by having a suitable preservative present, such as chloroform, and maintaining its presence by adding more chloroform if necessary whenever there is an interruption in the purifying procedure; though such chloroform would not be necessary during the later purifying steps, as then the alcohol used as noted below serves as a preservative.

After centrifuging, the liquid may be filtered if desired, out of abundance of caution, although that is ordinarily not necessary.

One example of my process of purification and concentration is as follows:

Following centrifuging and filtering as above set forth, the liquid is preferably reduced in volume, by evaporation at low temperature, and conveniently by vacuum evaporation, say to about one-fifth of its original volume or less. This concentrated fluid may be and has been used to advantage without further treatment. This reduction in volume is not only for the purpose of concentrating the fluid itself, according to my invention, but it is also to increase the concentration of proteins and other organic matter, to make more marked the lines of separation between different fractions, and to make the subsequent operations in smaller bulk and with smaller quantities of reagents, all of which is highly desirable.

The concentrated amniotic fluid, which is still liquid, may now be filtered again if desired. Then alcohol is added to it, until an alcohol concentration of about 70% is reached. Various alcohols may be used, such as various commercial denatured alcohols. For instance, I may use either ethyl alcohol, or methyl alcohol, or a mixture of the two, or such a denatured alcohol as that designated as "2B", which contains about a half per cent of benzol. These are given merely as examples.

As the alcohol concentration rises to the 70% value noted, a marked precipitation occurs. This precipitate is removed, as by filtration; and may be discarded, as the greater part of the potency of the amniotic fluid for the desired purpose of preventing adhesions remain in the filtrate.

The filtrate thus obtained, after removal of the alcohol by evaporation, may be used effectively in preventing adhesions, as in abdominal, pleural, cerebral, or joint operations. Indeed, by reason of the removal in the precipitate of a large part of the original proteins and other substances, the possibility of harmful effects in the use of this filtrate is less than either in the original amniotic fluid even though sterilized or in the simple concentrated amniotic fluid. However, I prefer to purify still further, as follows:

As the first step in this additional purification, the volume of the amniotic fluid may be reduced still further, as by vacuum distillation. For instance, it may be reduced to about one-twentieth of the volume of the original amniotic fluid. This is to make still more marked the lines of separation between the different fractions to be obtained, and to reduce the quantities of reagents necessary. While this further reduction in volume is desirable, it is by no means an essential step.

With or without making this reduction in volume, a sufficient quantity of alcohol is now added to produce an alcohol concentration of about 92%, or even slightly higher. The same kinds of alcohol as were mentioned above may be used here, but in any case it is desirable to use for this higher alcohol concentration the same kind of alcohol that was used for the alcohol concentration to 70%. The alcohol which is used for this higher alcohol concentration must itself be of higher concentration than the final alcohol concentration desired, and is desirably of as high a concentration as possible to reduce the volume of material handled. If possible, absolute alcohol is desirable for obtaining this higher alcohol concentration.

Upon thus raising the alcohol concentration to 92%, or higher, a second precipitation occurs. This precipitate is the fraction which is insoluble between 70% and 92% (or higher) alcohol concentration; and contains the greater part of the desired potent material.

This second precipitate is now separated, as by filtration or decantation; and the filtrate may be discarded.

This second precipitate is now dissolved in distilled water but the volume of the aqueous solution obtained is desirably kept at only a fraction of that of the original amniotic fluid; so that it will be necessary to use but a small amount of the final solution as compared with the amount necessary to use of the original amniotic fluid. Usually, the final solution is made with sufficient distilled water to produce a volume of about one-fifth of that of the original amniotic fluid, as that is found to be a convenient concentration for use in and following operations.

It is found by experience that this final solution, which in this example is a solution of the matter of the original amniotic fluid that is soluble in 70% alcohol concentration and insoluble in 92% (or higher) alcohol concentration, contains the greater part of the active principle, or potent material, that tends to prevent adhesions. By preserving this fraction, and discarding those substances which are insoluble in 70% alcohol concentration and those which are soluble in 92% alcohol concentration, which substances constitute by far the greater part of the dissolved substances in the original unfractionated amniotic fluid, the danger of shock and other undesirable effects is greatly reduced, and indeed substantially eliminated.

The final solution as prepared by dissolving the second precipitate in water is now desirably filtered through a Berkefeld filter. The solution may be used as thus prepared. However, the use to which this material is put is such that exceptional precautions as to sterility should be taken; and I therefore prefer to add a suitable non-irritating preservative.

If the foregoing purification is carried out with the amniotic fluid reduced to a fifth or less of its original volume of amniotic fluid before the addition of alcohol for the first precipitation, the fractions which are obtained are fairly sharp, and much sharper than if the purification is carried out at less concentration. The alcohol concentrations of 70% and 92% given in the example are those I have found desirable in connection with a concentration to one-fifth or less of the original volume. If the reduction in the original volume is much different from 5 to 1, the apparent alcohol concentrations used (figuring the concentrate as all water although it is of course not all water) are desirably also shifted, slightly, in the same general direction, up or down, for the best results.

The alcohol concentrations given are merely approximate, however; for good purifications can be obtained even though these percentages are departed from to a considerable extent.

My purification consists largely in retaining that fraction of the original amniotic fluid which is soluble between certain limiting alcohol concentrations, and removing and discarding the fractions which are insoluble in alcohol concentrations below the lower of said values, and desirably removing and discarding the fractions which are soluble in alcohol concentrations at or above the higher of such values. This eliminates by far the greater part of the substances of the original amniotic fluids that either are physiologically inert or are harmful in connection with the surgical operations referred to.

By removing these inert or harmful substances, the danger of such complications as serum sickness and anaphylaxis is largely avoided.

I claim as my invention:

1. The process of purifying amniotic fluid, which consists in separating and preserving a fraction of such amniotic fluid which is insoluble at certain intermediate alcohol concentrations and discarding those fractions which are insoluble at lower alcohol concentrations and those which are soluble at higher alcohol concentrations.

2. The process of purifying amniotic fluid, which consists in separating and preserving a fraction of such amniotic fluid which is insoluble at certain intermediate alcohol concentrations and discarding those fractions which are insoluble at lower alcohol concentrations.

3. A purified and concentrated amniotic fluid, comprising amniotic fluid which contains the fraction of the original amniotic fluid that is insoluble at a certain intermediate alcoholic concentration, and from which the fractions which are soluble at that alcoholic concentration and the fractions which are insoluble at a certain lower alcoholic concentration have been removed.

4. A purified and concentrated amniotic fluid, comprising amniotic fluid which has been reduced in volume by evaporation at low temperatures and which contains the fraction of the original amniotic fluid that is insoluble at a certain intermediate alcoholic concentration, and from which the fractions which are soluble at that alcoholic concentration and the fractions which are insoluble at a certain lower alcoholic concentration have been removed.

5. The process of purifying amniotic fluid, which consists in removing co-present suspended matter, mixing with alcohol to produce a precipitate containing matter not desired and discarding such precipitate, and removing the alcohol from the remaining liquid.

6. The process of purifying amniotic fluid, which consists in mixing with alcohol to produce a precipitate containing matter not desired and discarding such precipitate, and removing the alcohol from the remaining liquid.

7. The process of purifying amniotic fluid, which consists in removing co-present suspended matter, mixing with alcohol to produce a precipitate containing matter not desired and discarding such precipitate, mixing with more alcohol to obtain a higher alcohol concentration and thereby produce a second precipitate which latter contains potent material of the original amniotic fluid, and separating and preserving the second precipitate and discarding the remaining liquid.

8. The process of purifying amniotic fluid, which consists in mixing with alcohol to produce a precipitate containing matter not desired and discarding such precipitate, mixing with more alcohol to obtain a higher alcohol concentration and thereby produce a second precipitate which latter contains potent material of the original amniotic fluid, and separating and preserving the second precipitate and discarding the remaining liquid.

9. The process of purifying amniotic fluid, which consists in reducing the volume of the initial amniotic fluid by evaporation at low temperature, mixing with alcohol to produce a precipitate containing matter not desired and discarding such precipitate, and removing the alcohol from the remaining liquid.

10. The process of purifying amniotic fluid, which consists in reducing the volume of the initial amniotic fluid by evaporation at low temperature, mixing with alcohol to produce a precipitate containing matter not desired and discarding such precipitate, mixing with more alcohol to obtain a higher alcohol concentration and thereby produce a second precipitate which latter contains potent material of the original amniotic fluid, and separating and preserving the second precipitate and discarding the remaining liquid.

11. The process of purifying amniotic fluid, which consists in removing co-present suspended matter, mixing with alcohol to produce a precipitate containing matter not desired and discarding such precipitate, mixing with more alcohol to obtain a higher alcohol concentration and thereby produce a second precipitate which latter contains potent material of the original amniotic fluid, separating and preserving the second precipitate and discarding the remaining liquid, and forming a solution of the second precipitate as the final purified amniotic fluid.

12. The process of purifying amniotic fluid, which consists in mixing with alcohol to produce a precipitate containing matter not desired and discarding such precipitate, mixing with more alcohol to obtain a higher alcohol concentration and thereby produce a second precipitate which latter contains potent material of the original amniotic fluid, separating and preserving the second precipitate and discarding the remaining liquid, and forming a solution of the second precipitate as the final purified amniotic fluid.

13. A purified and concentrated amniotic fluid, comprising amniotic fluid which contains most of the potent matter of the original amniotic fluid but has had water evaporated therefrom by evaporation at sufficiently low temperatures to avoid destruction of such potent matter.

14. A purified and concentrated amniotic fluid, comprising amniotic fluid which contains a fraction of the original amniotic fluid which is soluble at the lower alcohol concentrations and from which certain fractions which are insoluble in such lower alcohol concentrations have been removed.

15. A purified and concentrated amniotic fluid, comprising amniotic fluid which contains most of the potent matter of the original amniotic fluid but has had water evaporated therefrom by evaporation at sufficiently low temperatures to avoid destruction of such potent matter, and which contains a fraction of the original amniotic fluid which is soluble at the lower alcohol concentrations and from which certain fractions which are insoluble in such lower alcohol concentrations have been removed.

16. A purified and concentrated amniotic fluid, comprising amniotic fluid which contains the greater part of the potent substances thereof which tend to prevent adhesions, but from which has been removed the greater part of the originally co-present organic substances which are inert to prevent adhesions or are potentially harmful.

17. The process of purifying amniotic fluid, which consists in removing therefrom and discarding those fractions which are insoluble in alcohol concentratons up to seventy per cent (70%).

18. The process of purifying amniotic fluid, which consists in removing therefrom and discarding those fractions which are insoluble in alcohol concentrations up to seventy per cent (70%) and those which are soluble in alcohol concentrations above ninety-five per cent (95%).

19. A purified and concentrated amniotic fluid comprising amniotic fluid which contains a fraction of the original amniotic fluid that a soluble at an alcohol concentration of between seventy (70) and eighty per cent (80%) but insoluble at an alcohol concentration of between ninety (90) and ninety-five per cent (95%), and from which the fractions which are insoluble in alcohol concentrations below about seventy per cent (70%) have been removed.

20. A purified and concentrated amniotic fluid, comprising amniotic fluid which contains a fraction of the original amniotic fluid that is soluble at an alcohol concentration of between seventy (70) and eighty per cent (80%) but insoluble at an alcohol concentration of between ninety (90) and ninety-five per cent (95%), and from which the fractions which are insoluble in alcohol concentrations below about seventy per cent (70%) and those which are soluble in alcohol concentrations above about ninety-five per cent (95%) have been removed.

In witness whereof, I have hereunto set my hand at Indianapolis, Indiana, this 25th day of April, A. D. one thousand nine hundred and twenty eight.

JASPER P. SCOTT.

CERTIFICATE OF CORRECTION.

Patent No. 1,699,479.                    Granted January 15, 1929, to

JASPER P. SCOTT.

It is hereby certified that error appears in the above numbered patent requiring correction as follows: In the grant, and in the heading to the printed specification, title of invention for, "Amniotic Fluids and Processes of Preparing Them" read "Purified Amniotic Fluids and Processes of Preparing Them"; page 2, line 129, after the word "water" insert a semi-colon; page 4, line 117, claim 19, after the word "fluid" insert a comma, and line 119, for the article "a" read "is"; and that the said Letters Patent should be read with these corrections therein that the same may conform to the record of the case in the Patent Office.

Signed and sealed this 19th day of March, A. D. 1929.

M. J. Moore,
Acting Commissioner of Patents.

(Seal)

tion of between seventy (70) and eighty per cent (80%) but insoluble at an alcohol concentration of between ninety (90) and ninety-five per cent (95%), and from which the fractions which are insoluble in alcohol concentrations below about seventy per cent (70%) and those which are soluble in alcohol concentrations above about ninety-five per cent (95%) have been removed.

In witness whereof, I have hereunto set my hand at Indianapolis, Indiana, this 25th day of April, A. D. one thousand nine hundred and twenty eight.

JASPER P. SCOTT.

CERTIFICATE OF CORRECTION.

Patent No. 1,699,479.    Granted January 15, 1929, to

JASPER P. SCOTT.

It is hereby certified that error appears in the above numbered patent requiring correction as follows: In the grant, and in the heading to the printed specification, title of invention for, "Amniotic Fluids and Processes of Preparing Them" read "Purified Amniotic Fluids and Processes of Preparing Them"; page 2, line 129, after the word "water" insert a semi-colon; page 4, line 117, claim 19, after the word "fluid" insert a comma, and line 119, for the article "a" read "is"; and that the said Letters Patent should be read with these corrections therein that the same may conform to the record of the case in the Patent Office.

Signed and sealed this 19th day of March, A. D. 1929.

M. J. Moore,
Acting Commissioner of Patents.

(Seal)